J. H. SANGERS.
DRY CELL BATTERY.
APPLICATION FILED JULY 31, 1917.
1,258,257.  Patented Mar. 5, 1918.
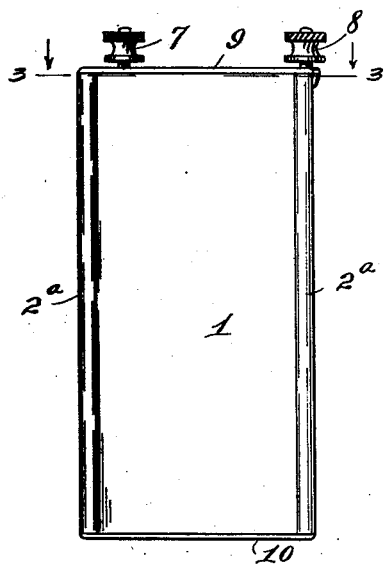
Fig. 1
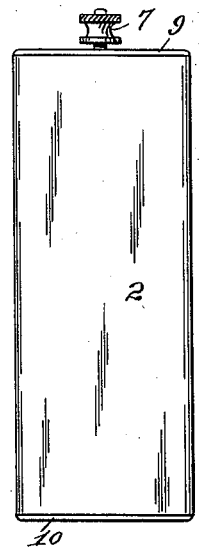
Fig. 2
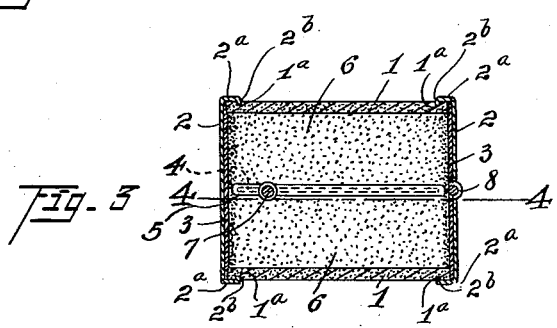
Fig. 3
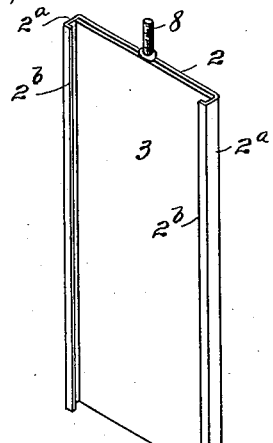
Fig. 6
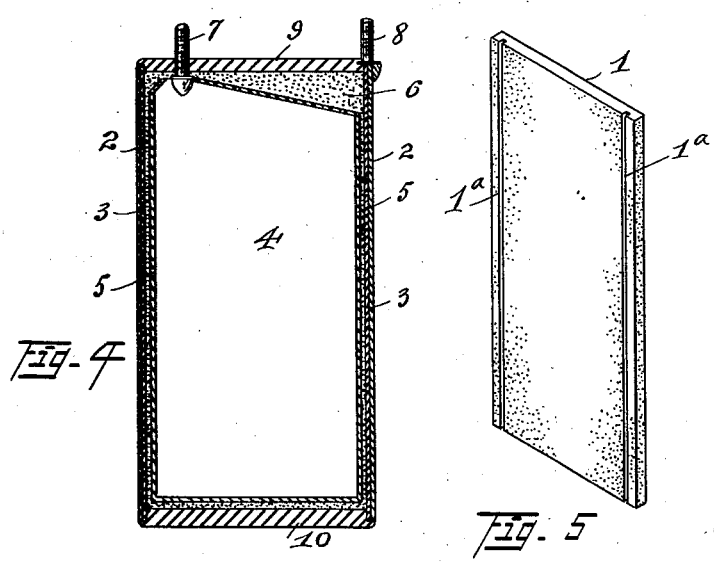
Fig. 4
Fig. 5
Inventor
John H. Sangers

UNITED STATES PATENT OFFICE.

JOHN H. SANGERS, OF CLEVELAND, OHIO, ASSIGNOR TO THE HY-WATT BATTERY COMPANY, OF CLEVELAND, OHIO.

DRY-CELL BATTERY.

1,258,257.

Specification of Letters Patent.

Patented Mar. 5, 1918.

Application filed July 31, 1917. Serial No. 183,657.

*To all whom it may concern:*

Be it known that I, JOHN H. SANGERS, a citizen of the United States, residing at Cleveland, in the county of Cuyahoga and State of Ohio, have invented certain new and useful Improvements in Dry-Cell Batteries, of which the following is a specification.

This invention relates to improvements in dry-cell batteries; the primary object of the invention being to provide a cheap, serviceable, economical and convenient construction which will develop a maximum efficiency, and one that will hold up, or preserve its voltage until the chemicals and the zinc are completely exhausted.

With this object in view the invention consists in the construction, combination and arrangement of the parts as hereinafter described and pointed out definitely in the claims, reference being had to the accompanying drawing which is made a part of the specification and in which similar characters of reference are employed to designate similar parts.

In the said drawing Figures 1 and 2 are views of the battery cell in elevation and shown at right angles to each other.

Fig. 3 is a cross-section on line 3—3, Fig. 1.

Fig. 4 is a medial vertical section of the cell on a line as indicated by line 4—4 Fig. 3.

Fig. 5 is a perspective view of one of the cathode members, and Fig. 6 is a perspective view of the inclosing side members which will be fully understood from the following description.

In carrying out the improved simplified construction, duplicate carbon plates 1 are provided, these plates have grooves $1^a$ extending longitudinally in their outer surfaces, that is to say in the surfaces which are on the exterior of the cell when said cell is assembled. The grooves $1^a$ are parallel with and close to the edges of the plates—in practice approximately $\frac{1}{8}$ of an inch from the edges. Duplicate spacing and binding members 2 of tin or other suitable material are formed with lateral channels $2^a$ that provide lips $2^b$ adapted to be pressed into the grooves $1^a$.

Non-corrosive, water-proof lining members 3 consisting of paper coated with paraffin on their outer surfaces and having their inner surfaces coated with asphaltum impregnated with crushed coke are spread over the entire inner faces of the members 2 before said members 2 are pressed into their connections with the carbon plates 1.

When members 1 and 2 are combined as described, they form a rectangular box open at both ends, with the edges of the carbon plates embedded, or in tight contact with the lining members 3, and the carbon sides of the rectangular box or container form the cathodes of the battery.

Medially located within the box thus formed is an anode consisting of a zinc plate 4 enveloped in suitable absorbent material, preferably bibulous paper 5. A depolarizing mixture of suitable chemicals with powdered carbon and manganese dioxid 6 is filled and tightly packed in the space between the anode and the inner walls of the box.

The anode is provided with a binding post 7, and a binding post 8 attached to one of the members 2 connects the cathodes. After the elements are assembled as described the top and bottom of the container are hermetically sealed by a suitable sealing compound as shown at 9 and 10.

The above described construction provides a maximum of efficiency in a cell that can be made at comparative small cost; that is durable and convenient to handle and to combine in multiples.

What I claim and desire to secure by Letters Patent is—

1. A dry cell battery comprising two flat carbon plates spaced apart and connected by two metallic side members thereby forming a rectangular container the carbon sides of which provide cathodes, non-corrosive water-proof lining members on the interior of the members connecting the carbon plates, an anode and battery mix tightly packed within the container around the anode, and means for sealing the ends of the container.

2. A dry cell battery comprising duplicate flat carbon plates spaced apart and connected by duplicate side members thereby forming a rectangular container, the carbon sides of which provide cathodes, non-corrosive water-proof lining members on the interior of the connecting side members, an anode consisting of a zinc plate enveloped in bibulous material arranged within the container, battery mix tightly packed within the container around the anode, and means for hermetically sealing the container.

In testimony whereof I affix my signature.

JOHN H. SANGERS.